United States Patent [19]

Sumitomo

[11] Patent Number: 4,645,447
[45] Date of Patent: Feb. 24, 1987

[54] SPLIT MOLD DEVICE FOR BLOW-MOLDING CROOKED ARTICLES

[76] Inventor: Ushigoro Sumitomo, No. 29-1, Puraza, Omiya-shi, Japan

[21] Appl. No.: 756,132

[22] Filed: Jul. 17, 1985

[51] Int. Cl.$^4$ .............................................. B29C 47/18
[52] U.S. Cl. ................................. 425/450.1; 264/531; 264/534; 249/161
[58] Field of Search .................. 425/131.1, 133.5, 528, 425/532, 500, 503, 504, 450.1; 264/335, 540, 526, 531, 570, 534, 529; 249/161, 162

[56] References Cited

U.S. PATENT DOCUMENTS

| | | | |
|---|---|---|---|
| 3,048,891 | 8/1962 | Maass | 425/532 |
| 3,311,684 | 3/1967 | Heider | 425/532 |
| 3,345,686 | 10/1967 | Settembrini | 425/532 |
| 3,672,799 | 6/1972 | Liebertz et al. | 264/529 |

Primary Examiner—Jay H. Woo
Assistant Examiner—Timothy W. Heitbrink
Attorney, Agent, or Firm—Millen & White

[57] ABSTRACT

A split mold device having a crooked cavity therein when closed for blow-molding therein a synthetic resin into a crooked article having such an irregular shape, comprising a pair of plates capable of relative movement in the horizontal direction for opening and closing a pair of split molds mounted on the confronting surfaces of said pair of the plates, each of said pair of split molds consisting of an upper part forming an upper portion of the crooked cavity, a lower part forming a lower portion of the crooked cavity and a main part forming a main portion of the crooked cavity, each of said upper parts of the pair of the split molds being mounted on a respective upper portion of the confronting surface of the pair of plates, each of said lower parts of the pair of the split molds being mounted on a respective lower part of the confronting surfaces of the pair of plates, each of said main parts of the pair of the split molds being slidably, in the split mold-opening and-closing direction, supported between the upper parts of the split molds and a respective lower part of the split molds on said pair of the plates; springs for elastically urging said main parts of the split molds at all times in the split mold-closing direction beyond said upper and lower parts of the split molds; and the means for generating an air current within the main crooked cavity formed when said pair of the main parts of the split molds are closed from the upper end opening to the lower end opening, thereof.

12 Claims, 4 Drawing Figures

SPLIT MOLD DEVICE FOR BLOW-MOLDING CROOKED ARTICLES

BACKGROUND OF THE INVENTION

The present invention relates to the split mold device for blow-making the synthetic resin crooked article having such an irregular shape, e.g., an "S", <, etc.

The present inventor has previously proposed the process for blow-making a synthetic resin article Japanese Pat. No. 1215482). Publication No. 57-128517, Japanese No. 1215482), which comprises the use of a pair of split molds, said split molds respectively consisting of three parts which, when closed, create an upper part forming an upper crooked cavity, a lower part forming a lower crooked cavity and a main part forming a main crooked cavity, the pair of the main mold parts when closed having an opening at the upper end opening thereof, through which the synthetic resin parison is directed into said main crooked cavity, and an opening at the lower end opening thereof, from which the inside of the said main crooked cavity is subjected to suction, whereby said parison is introduced into the cavity, the upper parts and lower parts of the pair of split molds being closed for holding the upper end and lower end of said parison, and air being blown into the parison for blow-molding.

The object of the present invention is to provide a split mold device which is capable of introducing smoothly and effectively the parison into the crooked cavity for blow-molding the synthetic resin article having such crooked shape, e.g., an "S" and "<" shape. The device is simple in construction and capable of accurately opening and closing the upper parts, lower parts and main parts of the split molds.

SUMMARY OF THE INVENTION

According to one aspect of the present invention, there is provided a split mold device for blow-molding a crooked article, which device comprises a pair of confronting plates capable of relative movement in a horizontal direction for closing and opening a pair of split molds mounted on the confronting surfaces of said pair of confronting plates, each of said split molds consisting of an upper part forming an upper portion of the crooked cavity, a lower part forming a lower portion of the crooked cavity and a main part forming a main portion of the crooked cavity, each of said upper parts of said pair of split molds being mounted on a respective upper portion of the confronting surfaces of said pair of plates in such manner that the crooked cavity forming surfaces thereof confront each other, each of said lower parts of said pair of split molds being mounted on a respective lower portion of the confronting surfaces of said pair of plates in such manner that the crooked cavity forming surfaces thereof confront each other, and each of said main parts of said pair of split molds being positioned on a respective confronting surface of said pair of plates and slidably supported between the upper part and the lower part of the split mold, causing their respective crooked cavity forming surfaces to face each other, and spring means for elastically urging the main part of the split mold all the time in the direction of closing the split mold, rather than the upper part of said split mold and the lower part of split mold, and means for causing an air current to flow into the inside of the crooked cavity formed by the main parts of the pair of the split molds where closed.

Thus, when the pair of plates are caused to make a relative movement in a horizontal manner for closing the split molds, the main parts of the split molds are closed.

Then, the parison is downwardly introduced at the upper opening into the crooked cavity of the main part of the split mold. At the same time, the air current is caused to downwardly run within said crooked cavity of the main part by said means for generating the air current. Thereby, said parison is smoothly introduced into the crooked cavity of the main part. Thereafter, said pair of the plates are further caused to make a relative movement in the same direction so as to close the molds.

The upper parts of the split molds and the lower parts of the split molds are closed, sealing off the parison introduced into the crooked cavity of the main part at the upper and lower ends thereof. This is for making the subsequent blow-molding of said parison possible thereby.

BRIEF DESCRIPTION OF THE DRAWINGS

Some preferred embodiments of the present invention are hereinafter illustrated, with reference to the drawings wherein.

Referring to FIGS. 1 and 2, fixed plates 2 and 2 are fixed on bed 1 in such a manner that are parallel to each other, with an appropriate distance in between.

Figure 1:
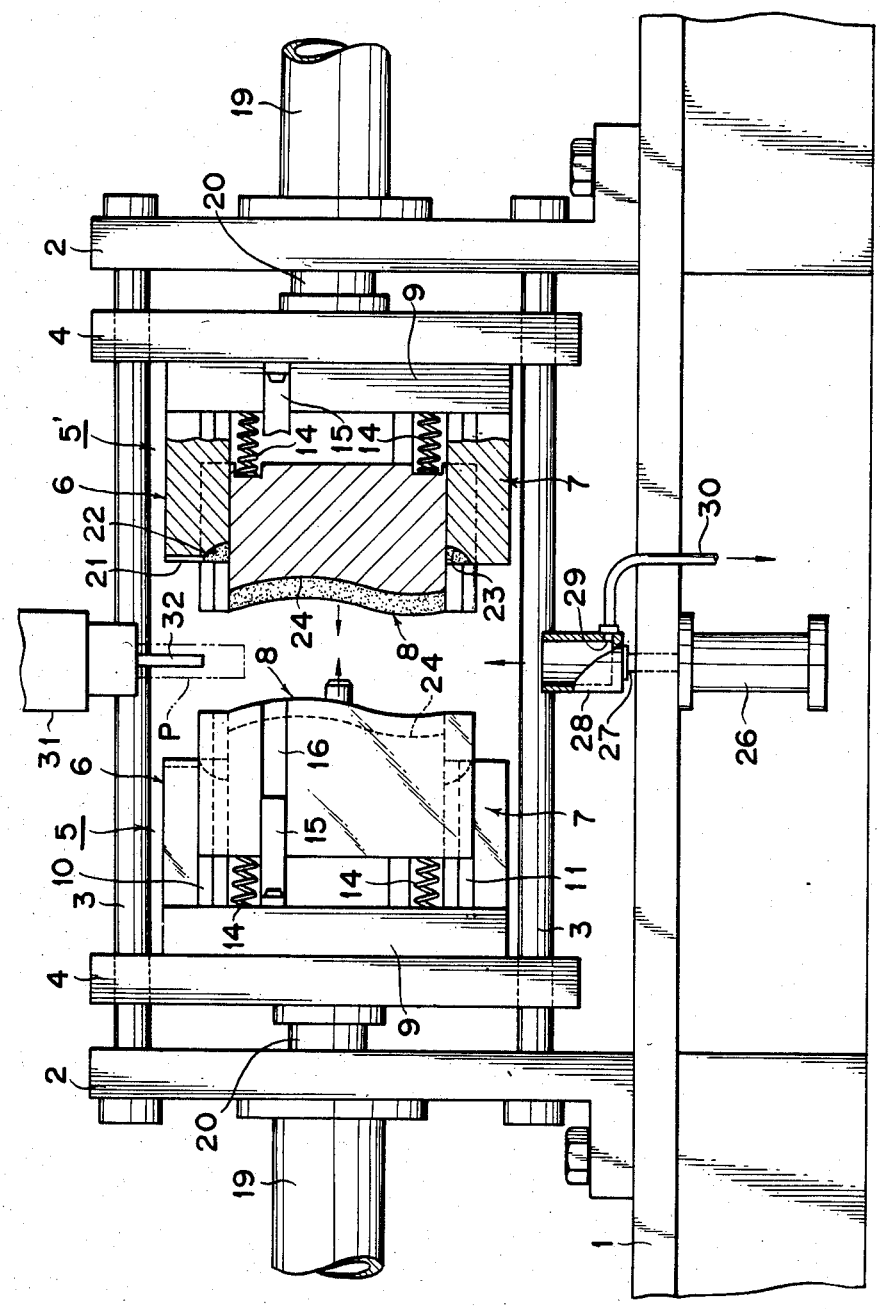
FIG. 1 is a fragmentary view in front elevation of the blow-molding device.

Four supporting rods 3 are horizontally positioned between fixed plates 2 and 2.

A pair of plates 4 and 4 are supported on the supporting rods 3 in such a manner that they can make a slidable movement in a horizontal direction.

A pair of split molds 5 and 5' are fixed on the confronting surfaces of the plates 4 and 4.

Oil pressure cylinders 19 and 19 are horizontally mounted on the plates 2 and 2. Rams 20 and 20 are mounted on the plates 4 and 4. Said cylinders 19 and 19 are provided to cause the pair of split molds 5' and 5' to make a movement in a confronting direction for opening and closing.

Figure 4:
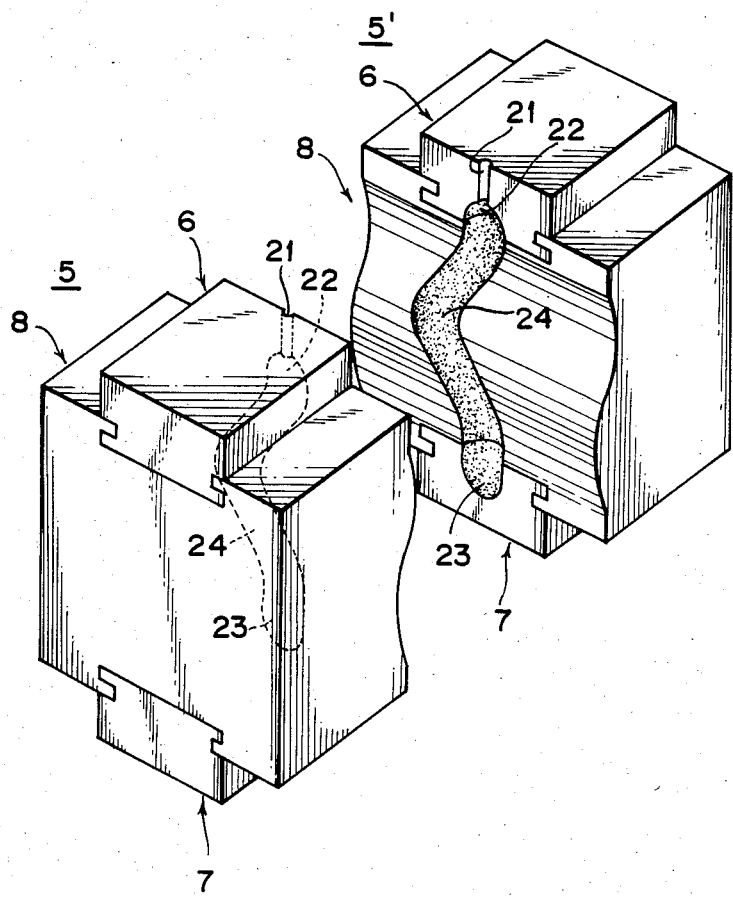
FIG. 4 is a view in perspective of the pair of split molds.

As shown in FIG. 4, said split molds 5 and 5 comprise respectively an upper part 6, a lower part 7 and a main part 8.

The split molds 5 and 5' have a base plate 9 fixed on the side facing the plate 4 of the other split mold.

The rectangular upper part 6 of the split mold and the rectangular lower part 7 of the split mold are fixed on the upper part and the lower part of the inside-facing side of said base plate 9 in a manner that their closing surfaces are horizontally projected in the mold-closing direction.

Figure 3:
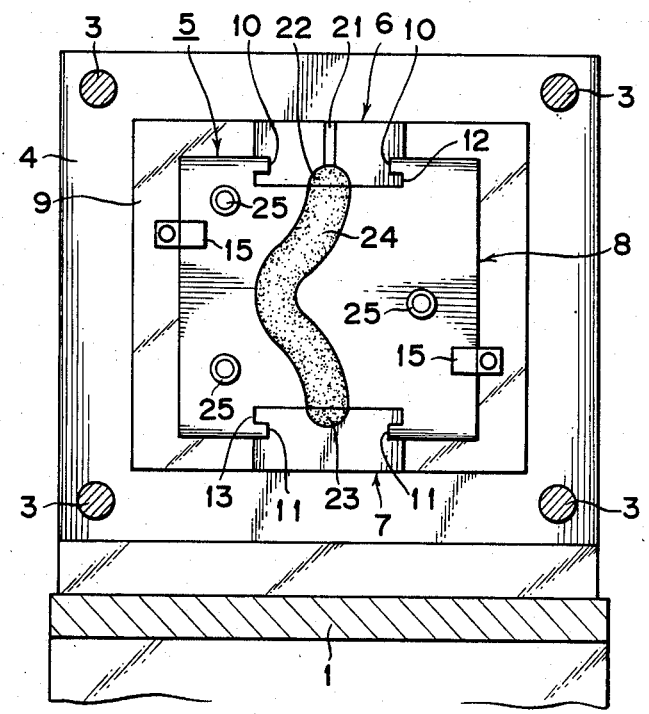
FIG. 3 is a view is section taken as indicated by the lines and arrows III—III which appear in FIG. 2.

As shown in FIG. 3, T-shape horizontally-extending guide rails 10 and 10, 11 and 11 are respectively provided on both sides of the upper part and lower part of the split mold.

On the other hand, as shown in FIG. 4, the main part 8 of the split mold is of a nearly-rectangular block wider than said upper part and lower part of the split mold and provided with T-shape grooves 12 and 13 both on the upper and lower surfaces.

These grooves 12 and 13 are slidably engaged with guide rails 10, 10 and 11 and 11 on the upper and lower parts respectively of the split mold.

Thereby, they are slidably projected so that they may be moved in the split mold-opening and -closing direction.

Further, as shown in FIG. 1 there are provided coil springs 14 between the main part 8 of split mold and the base plate 9. The coil spring presses the upper part 8 of the split mold all the time in the split-mold closing direction.

Further, the main part 8 of the split mold is positioned so as to be projected all the time properly, in the split mold-closing direction, by means of hook stoppers 15 and 15 beyond the upper part 6 and lower part 7.

Said hook stoppers 15 and 15 are slidably engaged within the grooves provided in the direction of the split-mold movement, on both sides of the main part 8 of the split mold. The hook stoppers are fixed at their bases on the base plates 9. The stopper functions by hooking the hook part 17 on its end with the step 18 inside the groove 16.

The upper, lower and main parts of the other split mold of the pair are likewise supported in the same manner as mentioned above.

Within the pair of the split molds 5 and 5', there are formed the half of the cavities for forming one-dimensionally and two-dimensionally crooked articles.

As shown in FIG. 4, the half 21 of the bore holding the blow pin and the half 22 of the upper end of the crooked cavity connecting with said half 21 of bore are provided on the closing surface of the upper parts of the molds 6 and 6.

The halves of the lower end parts 23 of the crooked cavities are formed on the closing surfaces of the lower parts 7 and 7 of the split molds.

The halves 24 of the main parts of the crooked cavities are likewise formed on the closing surfaces of the lower parts 8 and 8 of the main parts of the split molds.

Figure 2:
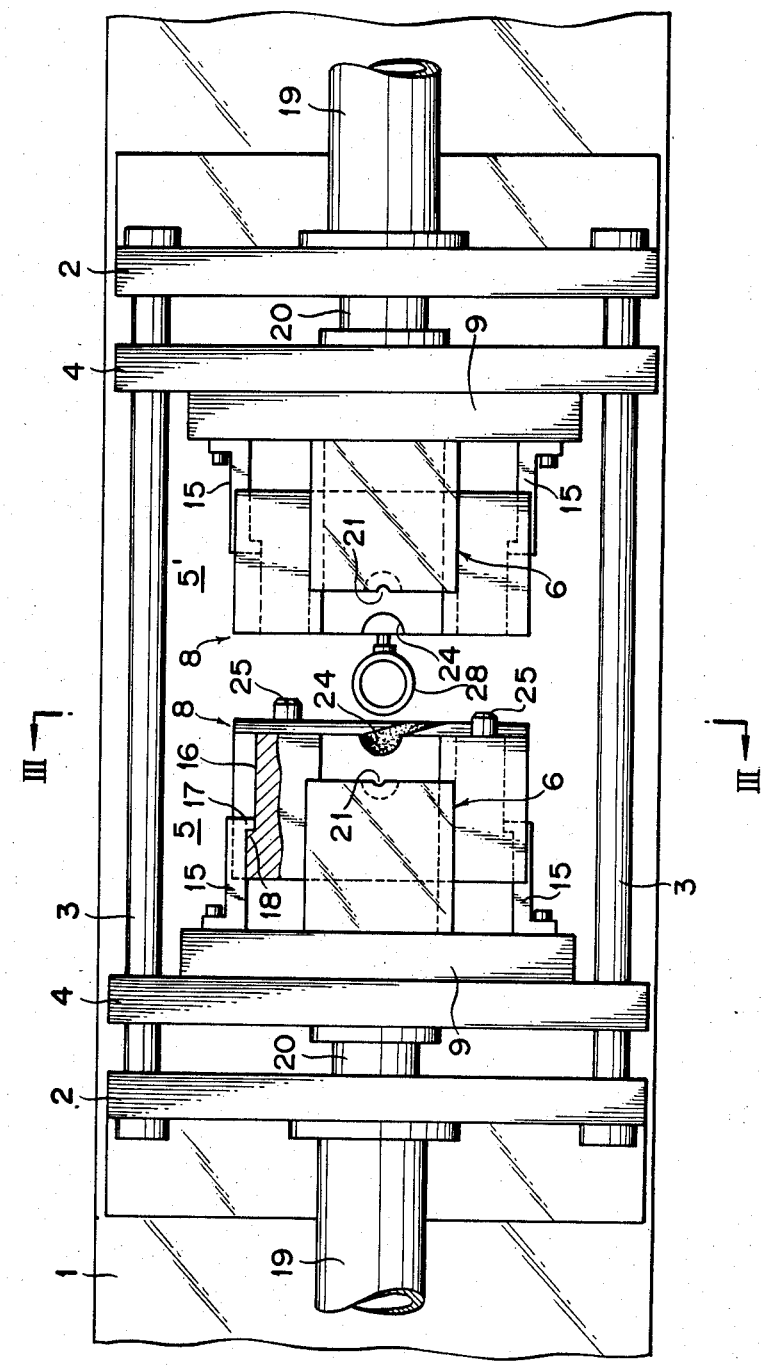
FIG. 2 is a fragmentary plane view of the blow-molding device.

As shown in FIG. 2, a plurality of guide-pins 25 project on the closing surface of the main part 8 of the one split mold of the pair for closing the split molds in elevation.

There are provided pin holders (not shown) each for engagement with a guide pin 25 on the main part of the other split mold of the pair. Further, a regular cooling jacket is provided within the inside of the main parts 8 and 8 of the split molds.

A suction device is provided under the closing surface of the split molds 5 and 5' when they are closed, for introducing the parison into the crooked cavities. This device comprises a ram 27 upwardly projected on an air cylinder 26 perpendicularly fixed on bed 1, a cup 28 with its mouth facing upwardly fixed on a ram 27, and the base 30, connected with the suction bore 29 made on the lower circumference of said cup.

Said cup is in a position to come into contact with the lower opening of the crooked cavity, on the main part, formed by the closed split molds 8 and 8, when said cup 28 is raised by the movement of the air cylinder 26.

An extruding die 31 of the extruder is provided above the closing surface of the split molds when they are closed. A blow pin 32 is downwardly projected from the center of the extruder being in a position to be held between the halves 21 and 21 of the pores, when the said upper parts of the split mold are closed.

Referring to FIGS. 1 and 2, the plates 4 and 4 and split molds 5 and 5' are moved in the mold-closing direction by the movement of the oil pressure cylinder. When the main parts of the molds only are closed, the above movement stops.

Under this condition, the cup 28 is firstly raised by the movement of the air cylinder 26 of the suction gadget.

The mouth of said cup 28 is caused to come into contact with the lower opening of the crooked cavity, on the man part, formed by the halves 24 and 24 of the crooked cavities of the main parts 8 and 8 of the split molds. At the same time, the suction activity is initiated through the hose 30. Thus, an air current running from the upper end to the lower end is generated within the said crooked cavity of the main part.

The cylindrical synthetic resin parison (P) is extruded from the extrusion die 31. It is caused to go down by its weight through the upper opening of the main crooked cavity. The said parison (P) is guided by said air current and smoothly introduced into the main crooked cavity.

When the lower end of said parison (P), in a proper length, enters into the cup 28 out of the lower opening of the main crooked cavity, the extrusion of the parison is caused to be stopped.

Then, after the cup 28 is caused to come down, the main parts 4 and 4 are caused to further move in the closing direction by the re-movement of the oil pressure cylinders 19 and 19.

The upper parts 6 and 6 of the split molds are thus closed, blow pin 32 is held between the halves 21 and 21 of the pore, and the parison (P) is sealed off at the upper end thereof. At the same time, the lower parts 7 and 7 of the split molds are closed and the parison (P) is sealed off at the lower end thereof.

The main parts 8 and 8 of the split molds are caused to move, resisting the spring 14, in a split-mold opening direction relative to the upper and lower parts of the split molds.

Air is then blown into the parison from the air pin 32 and the parison is inflated, thus ciompleting the blow molding as intended.

After the molding, the parison is cut off from the extrusion die 31. The split molds 5 and 5' are caused to open by the movement of the oil pressure cylinders 19 and 19, and the molded article is taken out.

What I claim is:

1. A split mold device for blow-molding a crooked article from a synthetic resin parison, comprising a pair of mounting plates having confronting surfaces and which are capable of relative movement in a horizontal direction, a pair of split molds mounted on the confronting surfaces of the mounting plates, each of said split molds having an upper member, a lower member and a centrally positioned main member, mounting means which mount the main member on the mounting plate separately from the upper and lower members and which urges the main member beyond the upper and lower member when the split mold device is in an open mold position, each of the three members of each split mold having a confronting surface with a recessed portion which forms, when the split mold device is closed and the confronting surface of each member of the split mold is in contact with the corresponding members of the other split mold, an upper portion, a lower portion and a main portion, respectively, of a continuous vertically aligned crooked cavity in which the parison is blow molded; an opening in the body of the split mold providing communication between a source of compressed air for the blow molding step and one end of the crooked cavity; means for moving the mounting plates and the split molds mounted thereon horizontally from an open mold position to a first closed mold position where only the confronting surfaces of the main members of the split molds are in a contacting position; means including a current of air for inserting the parison into and partially through the crooked cavity in the main members while the split mold is in the first closed mold position; the means for moving the mounting plates being adapted to move the upper and lower split molds mounted thereon horizontally, while the main members remain in a closed position and a parison is positioned in the crooked cavity therein, to a second closed mold position, where the confronting surfaces of the upper and lower members of the split molds as well as those of the main members are in contacting positions; and means for blow molding the parison while the split mold is in the second closed mold position.

2. The split mold device according to claim 1 wherein the means for generating the air current comprises a vacuum means.

3. The split mold device according to claim 2, wherein the vacuum means comprises a suction cup adapted to receive an end of the parison projecting beyond the lower surface of the main members while the split mold is in the first closed mold position and the parison has been inserted into the main members, which cup is connected to a source of a vacuum, and wherein the cup is associated with driving means for raising the cup to a first position wherein the mouth of the cup is in gas tight contact with a lower end opening of the crooked cavity of the main members of the split mold and retracting means for retracting the cup from the first position to a second position below the lower members of the split molds.

4. The split mold device according to claim 1, wherein the opening in the split mold providing communication with a source of compressed air is formed in the confronting surfaces of the upper members and forms halves of a bore adapted to receive and hold a blow pin connected to the source of compressed air when the split mold is in the second closed position.

5. The split mold device according to claim 2, wherein the opening in the split mold providing communication with a source of compressed air is formed in the confronting surfaces of the upper members and forms halves of a bore adapted to receive and hold a blow pin connected to the source of compressed air when the split mold is in the second closed position.

6. The split mold device according to claim 1, wherein the upper and lower members are mounted in a horizontally reciprocally slidable manner on upper and lower horizontal surface, respectively, of the main members.

7. The split mold device according to claim 6, comprising plastic extrusion means for forming the parison and extruding the parison into the crooked cavity formed in the main members when the split mold device is in the first closed position.

8. The split mold device according to claim 5, wherein the upper and lower members are mounted in a horizontally reciprocally slidable manner on upper and lower horizontal surface, respectively, of the main members.

9. The split molded device according to claim 8, wherein the blow pin is positioned relative to the plastic extrusion means such that a parison formed therein is extruded coaxially therefrom around the blow pin.

10. The split mold device according to claim 1, wherein the mounting means comprises springs which mount the main members on their respective mounting plates in a resilient yielding manner which permits the upper and lower members to be advanced to the second closed mold position in alignment with the main members while the main members are maintained in the first closed mold position.

11. The split mold device according to claim 1, wherein the means for generating the air current is a vacuum means which comprises a suction cup adapted to receive the end of the parison projecting beyond the lower surface of the main members while the split mold is in the first closed mold position and the parison has been inserted into the main members, which cup is connected to a source of the vacuum, and wherein the cup is associated with driving means for raising the cup to a first position wherein the mouth of the cup is in gas tight contact with the lower end opening of the crooked cavity of the main members of the split mold and with retracting means for retracting the cup from the first position to a second position below the lower members of the split molds, wherein the opening in the split mold providing communication with a source of compressed air is formed in the confronting faces of the upper members and forms halves of a bore adapted to receive and hold a blow pin connected to the source of compressed air when the split mold is in the second closed position, wherein the upper and lower members are mounted in a horizontally reciprocally slidable manner on upper and lower surfaces, respectively, of the main members, wherein the split mold device comprises plastic extrusion means for forming the parison and extruding the passion into the crooked cavity formed in the main members when the split mold device is in the first closed position, and wherein the blow pin is positioned relative to the plastic extrusion means such that a parison when formed therein is extruded coaxially therefrom around the blow pin.

12. The split mold device according to claim 11, wherein the mounting means comprises springs which mount the main members on their respective mounting plates in a resilient yielding manner which permits the upper and lower members to be advanced to the second closed mold position in alignment with the main members while the main members are maintained in the first closed mold position.

* * * * *